J. Metzgar,
Glass Press.
N° 44,734. Patented Oct. 18, 1864.
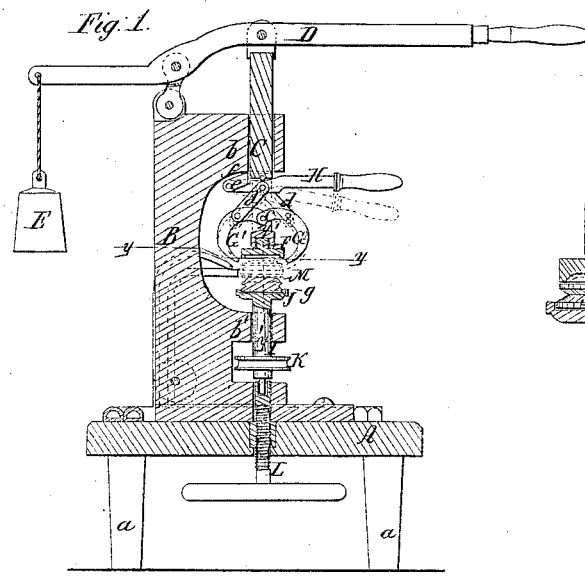
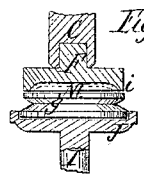
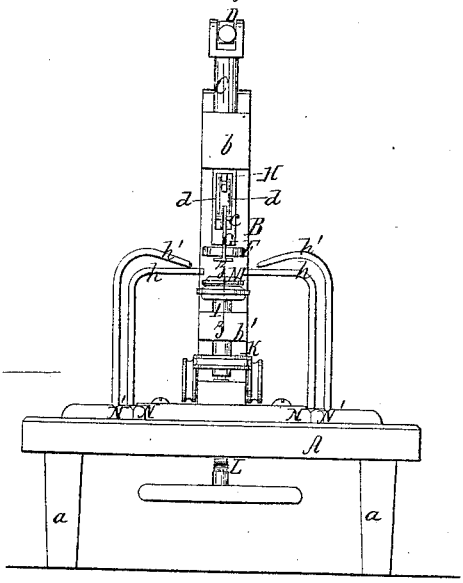
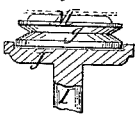
Witnesses:
J. P. Hall
Wm. P. McNamara
Inventor:
Joseph Metzgar

UNITED STATES PATENT OFFICE.

JOSEPH METZGER, OF EAST CAMBRIDGE, MASSACHUSETTS.

IMPROVED MACHINE FOR PRESSING WATCH-CRYSTALS.

Specification forming part of Letters Patent No. 44,734, dated October 18, 1864.

*To all whom it may concern:*

Be it known that I, JOSEPH METZGER, of East Cambridge, in the county of Middlesex and State of Massachusetts, have invented a new and Improved Machine for Pressing Watch-Crystals; and I do hereby declare that the following is a full, clear, and exact description thereof, which will enable those skilled in the art to make and use the same, reference being had to the accompanying drawings, forming part of this specification, in which—

Figure 1, Sheet No. 1, is a side sectional view of my invention, taken in the line $x\ x$, Fig. 2; Fig. 2, a horizontal section of the same, taken in the line $y\ y$, Fig. 1; Fig. 3, an enlarged detached sectional view of the dies pertaining to the same, taken in the line $y'\ y'$, Fig. 1. Fig. 4, Sheet No. 2, is a front elevation of the machine; Fig. 5, an enlarged vertical section of a portion of Fig. 4, taken in the line $z\ z$.

Similar letters of reference indicate corresponding parts.

This invention relates to a new and improved machine for pressing watch-crystals into the proper or desired form. Watch-crystals are constructed by cutting circular pieces out of a glass globe blown of a suitable size and thickness, and these pieces are heated and pressed between dies so as to flatten or reduce their convexity and bring them to the proper shape or form.

The object of the within-described invention is to facilitate the heating and pressing operations and produce work superior and with less expense than can be done by the means hitherto employed for the purpose.

A represents a horizontal bed-piece or platform which is supported at a suitable height by legs $a$, and B is an upright secured to the bed-piece A and provided with two lateral projections or arms, $b\ b'$, the upper one, $b$, serving as a guide or bearing for a vertical arbor, C, which is raised and lowered by means of a lever, D, provided at one end with a weight or counterpoise, E. (See Fig. 1.) To the lower end of the arbor C there is attached a female die, F, corresponding in form to the exterior surface of the crystals to be pressed, and within said arbor above the die F there are fitted two hooks, G G', both of which work on a pivot or pin, $c$, passing transversely through the arbor, each connected by links $d$ $d$ to a lever, H, which has its fulcrum-pin $e$ passing through an arm, $f$, attached to the arbor C. By operating this lever H the hooks G G' may be brought together or spread apart at their lower ends, for the purpose hereinafter specified. In the lower arm, $b'$, there is fitted a vertical arbor, I, which has a shallow cup or socket, J, on its upper end. This arbor is allowed to turn freely in the arm $b'$, and it has a pulley, K, upon it, around which a rope or band passes from any suitable driving-shaft. The lower end of the arbor I rests upon or is stepped in a screw, L, by turning which said arbor may be raised or lowered.

M represents a detached die of such dimensions that it may be fitted in the cup or socket J on the arbor I. The upper or face side of this die is of convex form and corresponds to the inner or concave side of the crystal, a groove, $g$, being made circumferentially in the die M to receive the ends of the hooks G G'.

On the bed-piece A there are two tubes, N N', which may be in the form of circles or portions thereof, one within the other and encompassing the upright B. The tube N has two pipes, $h\ h$, communicating with it, which extend upward a certain distance and are bent over horizontally toward the die M. The tube N' is provided with two similar pipes, $h'$ $h'$, which are not quite as long as the pipes $h$ $h$, and are directly over them. The tube N is connected with a gas-receptacle, and the tube N' is a blast-tube, the pipes $h'\ h'$ serving to blow and concentrate the heat of the jets at the ends of the pipes $h\ h$ on the crystal to be pressed.

The operation is as follows: The crystals, after being cut out from the globe, are laid one at a time on the upper or face side of the die M in the cup or socket J, and a rotary motion given the arbor I. The crystal soon becomes heated under the action of the blow-pipes $h'$ and evenly heated all around in consequence of the rotation of the arbor I and die M. When the crystal is sufficiently heated, which requires but a short time, the operator raises the lever H and thereby throws out the lower ends of the hooks G G', and then by actuating the lever D forces down the arbor C, and the female die F is pressed down upon the heated crystal, which is molded in proper form between the two dies F M.

When the die F is pressed down on the die M, the hooks G' G' catch into the groove g of die M, and by actuating the lever D the arbor C, with the die M attached, will be raised, and another die, M, is placed in the cup or socket J and a crystal placed upon it, which is heated while the crystal previously pressed with the die M is detached from the die F. Thus it will be seen that the crystals may be expeditiously heated and pressed and the work done in a perfect and expeditions manner.

I would remark that in order to have the crystals pressed with finished edges I have the face of the die M provided with a horizontal flange, i, upon which the edges of the crystals are pressed by the die F. (See Fig. 3.) This obviates the forming of a burr at the edge of the crystal and saves much labor in grinding and finishing the crystals.

I would remark that instead of having the die M rotate, it may be stationary, and the jets and blow-pipes may be made to rotate. The same end would be obtained in either case, but the former I prefer as being the most simple. By adjusting the arbor I higher or lower through the medium of the screw L, the crystal on die M may be brought in proper relation with the jets from pipes h h.

I claim as new and desire to secure by Letters Patent—

1. The removable or detachable die M, in connection with a rising and falling or pressing die F, and a cup or socket, J, rotary or stationary, to hold or retain the die M, substantially as and for the purpose herein set forth.

2. The employment or use of jets of gas or other flames and blow-pipes, when arranged and used in connection with dies to operate substantially as and for the purpose set forth.

3. The hooks G G', applied to the arbor C, when used in connection with the removable or detachable die M, for the purpose herein specified.

JOSEPH METZGER.

Witnesses:
JAMES P. HALL,
M. M. LIVINGSTON.